United States Patent [19]

Maxwell

[11] Patent Number: 4,605,097
[45] Date of Patent: Aug. 12, 1986

[54] PORTABLE TREE STAND

[76] Inventor: Thurman L. Maxwell, 108 Jackson St., Cookeville, Tenn. 38501

[21] Appl. No.: 733,262

[22] Filed: May 13, 1985

[51] Int. Cl.4 .............................................. A01M 31/02
[52] U.S. Cl. ....................................... 182/92; 182/187
[58] Field of Search ................. 182/187, 222, 223, 82, 182/92; 47/42, 43

[56] References Cited

U.S. PATENT DOCUMENTS

| | | | |
|---|---|---|---|
| 740,740 | 10/1903 | Brown | 47/42 |
| 740,741 | 10/1903 | Brown | 47/42 |
| 1,250,699 | 12/1917 | Sturgel | 182/187 |
| 1,823,385 | 9/1931 | Barker | 182/187 |
| 4,139,080 | 2/1979 | Wells | 182/222 |
| 4,290,504 | 9/1981 | Cuba | 182/187 |
| 4,445,591 | 5/1984 | Mitchell | 182/222 |

*Primary Examiner*—Reinaldo P. Machado

[57] ABSTRACT

A portable tree stand comprised of two main runners (10) attached to four extension arms (11) with bolts (12) and fastened by wing nuts (13). The main runners (10) have a slot (21) to receive three platform boards (14). The extension arms (11) are secured to the diverging tree branches (15,16,17) with rope (18).

Installation and access is accomplished by securing the rungs (19) to the diverging tree branches (15,17) with rope (18).

The portable tree stand compacts into a convenient package by removing the outermost bolt (12) on each end of the main runner (10) and folding the extension arms (11) inward.

4 Claims, 4 Drawing Figures

PORTABLE TREE STAND

SUMMARY OF THE INVENTION

A portable tree stand that is lightweight, compact, and versatile. It affords easy installation and quiet access to and from the stand. It provides more natural cover than conventional stands. It provides a stable and safe platform for hours of comfort. This portable tree stand causes no damage to trees and will be legal in all areas. This portable tree stand is versatile, and it easily installs in three individual trees, four individual trees, a tree with three diverging branches, or a tree with diverging limbs. This portable tree stand could be manufactured from readily available materials such as wood, fiberglass, plastic, aluminum, or the like.

I believe this portable tree stand could eliminate the use of illegal stands being nailed to trees destroying the natural beauty of the forest.

Figure 1:
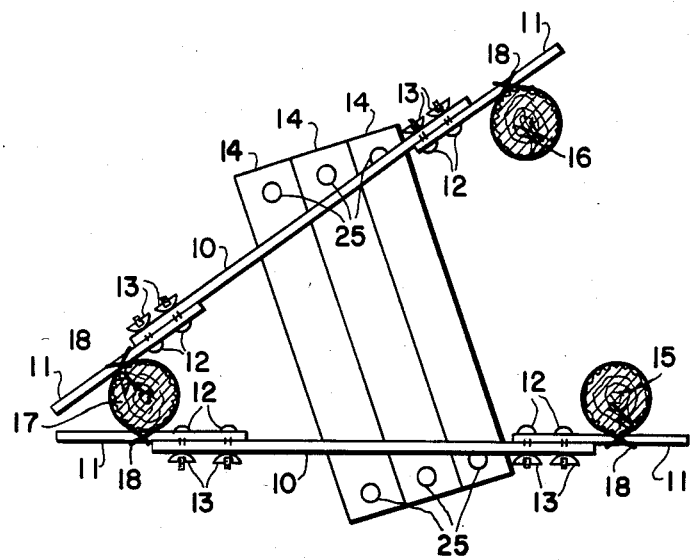
FIG. 1 is a plan view of the portable treestand represented here installed in a tree with three diverging branches.

While the invention is susceptible of various modifications and alternative forms, a specific embodiment thereof has been shown by way of example in the drawings and will herein be described in detail, it should be understood, however, that it is not intended to limit the invention to the particular form disclosed but, on the contrary, the invention is to cover all modifications, equivalents and alternatives falling within the spirit and scope of the invention as expressed in the appended claims.

DESCRIPTION OF THE PREFERRED EMBODIMENTS

Figure 3:
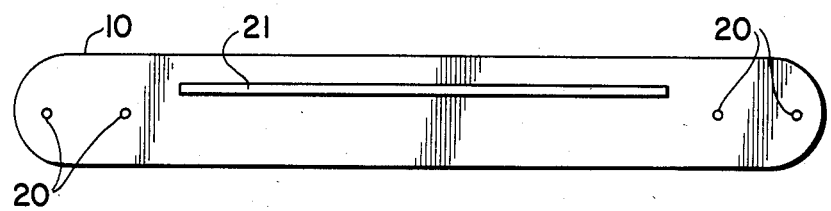
FIG. 3 is a view of the main runner showing more detail than can be shown in FIG. 2.
Figure 4:
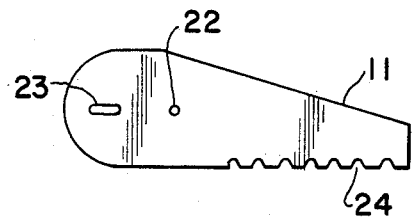
FIG. 4 is a view of the extension arm showing more detail than can be shown in FIG. 2.

Now with more particular reference to the drawings the portable treestand is made up of two main runners (10) that would be made from materials structurally sound to carry the weight of the desired load. Each main runner (10) would have four holes (20) and a slot (21) (See FIG. 3). Each main runner would be connected at each end to an extension arm (11). This extension arm (11) would be made from materials that would be structurally sound to carry the weight of the desired load. The extension arm (11) has at one end hole (22) and one slot (23) and at the other end a series of notches (24) (See FIG. 4). The main runner (10) would be connected to the extension arm (11) with bolts (12) and be fastened by wing nuts (13).

Figure 2:
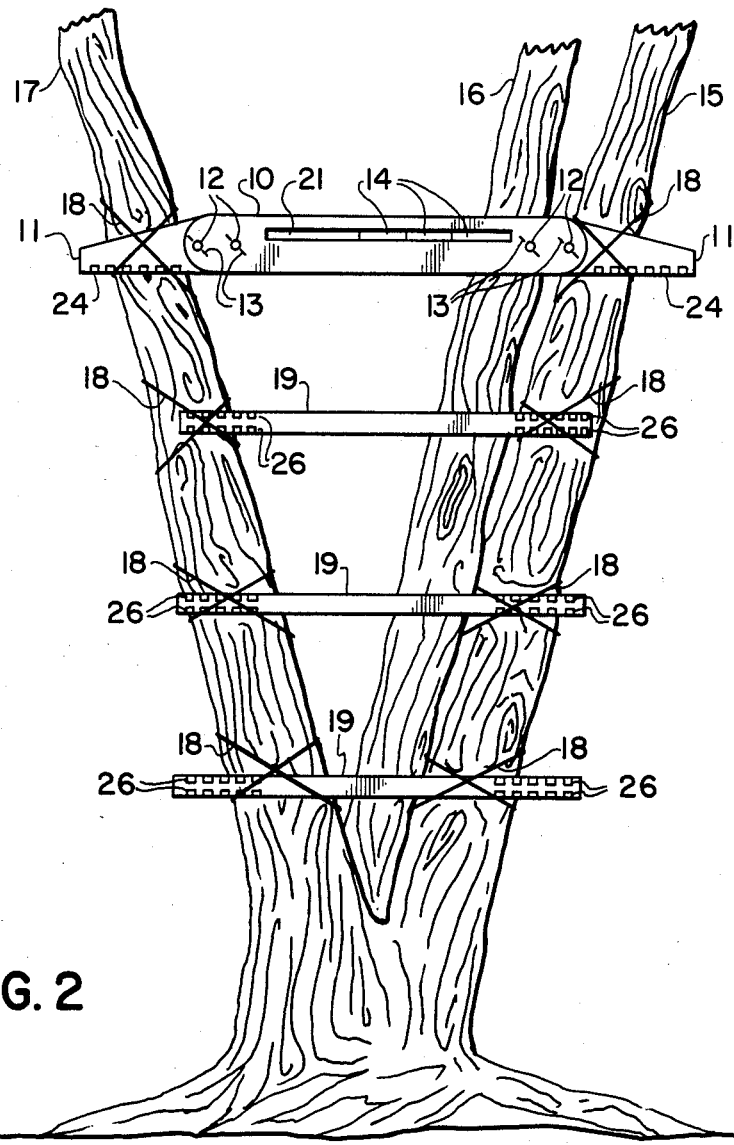
FIG. 2 is an elevation view of the portable treestand installed in a tree with three diverging branches.

Installation is accomplished by securing the rungs (19) (See FIG. 2) to the diverging tree branches (15,17) with rope (18) usually catching in the notches (26). Each extension arm (11) is then secured to the diverging tree branches (15,16,17) with rope (18) and rope catching in notches (24). The platform boards (14) are slid into place through the slot (21) in the main runners (10). The platform boards (14) would be made from materials that would be structurally sound to carry the weight of the desired load. After installing the portable treestand, easy and quiet access to and from the stand is possible.

By removing the outermost bolt (12) on each main runner (10) the extension arms (11) will fold inward. The slot (23) will allow the extension arms to shift and meet exactly at the center line of the main runner (10) for convenient packaging. The holes (25) in the platform boards (14) allow the wing nuts (13) to recess into the platform boards (14) for convenient packaging.

The entire portable treestand folds into a convenient package and an optional carrying case will be available.

The embodiments of the invention in which an exclusive property or privilege is claimed are as follows:

1. A portable treestand to be supported by three individual trees, four individual trees, a tree with three or four diverging limbs comprising an elongated main runner (10) having holes (20) located at both ends to fasten to each end an extension arm (11) with bolts (12) and secured by wing nuts (13), said main runner also having a slot (21) to receive platform boards (14).

2. A portable treestand as claimed in claim 1 wherein the extension arm (11) having at one end one hole (22) and one slot (23) to receive said bolts (12) in fastening to the main runner (10) the other end having a series of notches (24) for receiving a rope (18) in securing the extension arm (11) to the diverging tree branch (15).

3. A portable treestand as claimed in claim 1 wherein the platform board (14) is designed to slide through the slot (21) in the main runners (10) to create a suitable platform and having a hole (25) in each end is to allow the wing nut (13) to recess into the platform board (14) when stacked for carrying.

4. A portable treestand as claimed in claim 2 wherein an elongated rung (19) having notches (26) at both ends thereof is attached to said tree by means of ropes (18) wrapped around said tree and notches (26), said rung being located below said main runners (10) when the treestand is in operative position.

* * * * *